Sept. 6, 1966    S. R. OVSHINSKY    3,271,719
RESISTANCE SWITCHES AND THE LIKE
Original Filed June 21, 1961

*INVENTOR.*
STANFORD R. OVSHINSKY
BY Colman, Nord & Krass

ATTORNEYS

United States Patent Office 3,271,719
Patented Sept. 6, 1966

3,271,719
RESISTANCE SWITCHES AND THE LIKE
Stanford R. Ovshinsky, Bloomfield Hills, Mich., assignor to Energy Conversion Devices, Inc., Troy, Mich., a corporation of Delaware
Original application June 21, 1961, Ser. No. 118,642. Divided and this application Oct. 11, 1965, Ser. No. 502,812
7 Claims. (Cl. 338—28)

This invention relates to resistance switches, relays, amplifiers, and the like, and this application is a division of my copending application Serial No. 118,642, filed June 21, 1961, now abandoned.

By the term "resistance switch" I mean a device which under certain internal thermodynamic conditions is capable of substantially blocking the flow of electrical current therethrough, while at other internal thermodynamic conditions it is capable of allowing a substantial flow of electrical current to pass therethrough, without requiring a mechanical motion of switching elements incorporated therein to make or break an electrical contact.

I have found that a variation of temperature may constitute such a change in conditions. I have also found that a variation of applied electrical charge may be used to trigger a change of internal resistance suitable for effectuating this type of resistance switching. I have also found that a similar result may be obtained by chemisorption or desorption of a reactive gas on the surface of a metal film which is used as a resistance switch element, and that this may be effectuated by a change in temperature.

Such devices may be used to block or unblock a power line as a switch, circuit breaker or fuse, as a relay to open or close a separate power circuit, to actuate an alarm circuit, to amplify an applied electrical power input, or in other known ways. They may be used for very rapid change from a substantially "open" circuit to a substantially "closed" circuit, as in the case of conventional switches. Alternatively, they may be used as a "dimmer switch," i.e. a switch which gradually causes a change from an "open" to a "closed" circuit, or vice versa, by gradual modulation of the amplitude of the current, as is sometimes desired in lighting circuits. They may also, if desired, be stabilized temporarily or indefinitely at one or more intermediate "partly closed" conditions. In general, they are useful for A.C. circuits, and in certain cases they may also be used for D.C. circuits.

An object of the invention is to provide resistance switches and the like, of the character above described, in which moving parts are eliminated. Another object of the invention is to provide resistance switches and the like which are small in size, light in weight, exceptionally low in cost, and usable in any spatial position since they are independent of gravity for their operation. A further object of the invention is to provide resistance switches and the like which are suitable for use with A.C. circuits, having the ability to block A.C. voltage of commercial magnitude, e.g. 110 or 220 volts, with no appreciable leakage, and which rapidly and reversibly change their internal resistance upon the application of an external stimulus to permit the flow of A.C. current therethrough with acceptably low internal resistance.

An advantage of the invention is that it provides switches, relays, and the like which are not subject to mechanical wear, since no moving parts are employed. Another advantage of the invention is that it provides amplifiers which are analogous in function to transistors, except that they are not limited to D.C. currents but are particularly adapted to A.C. circuits. A further advantage of the invention is that it provides devices capable of rapid or of slow change between "open" and "closed" position, or to partially closed position. A further advantage of the invention is that the devices provided are particularly useful in connection with missiles and spacecraft, since they are very light in weight, may be made free of moving parts or flowing fluids which might affect stability of flight, are operable in any spatial position since they are independent of gravity for their operation, and may if desired be powered by sunlight.

Other objects and advantages will more fully appear from the following description and drawings, wherein are disclosed preferred embodiments of the invention.

In the drawings.

In the drawings, similar numerals represent similar parts.

Figure 1:
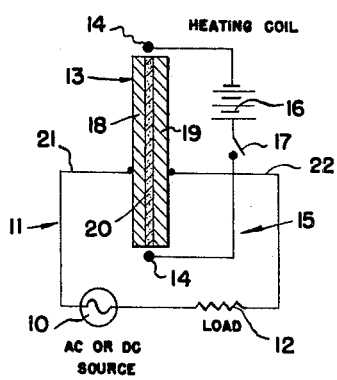
FIG. 1 is a schematic diagram showing a preferred embodiment of the invention.

Referring now to FIG. 1 of the drawings, there is shown schematically a preferred embodiment of the invention comprising a resistance switch which is operated by variation of its internal resistance with change of temperature. An A.C. or D.C. source 10, connected in the electrical circuit indicated generally at 11, acts to send current through load 12. The resistance switch element indicated generally at 13, however, normally blocks the flow of substantial current through circuit 11. A heating coil 14 suitably positioned adjacent to switch element 13 heats the switch element 13 when desired, thereby reducing its internal resistance (as discussed below), and hence in effect closes circuit 11 so as to allow the passage of the desired current therethrough at an acceptably low internal resistance.

Heating coil 14 may, for example, be activated by means of the electrical circuit indicated generally as 15, comprising a suitable source of electrical current such as battery 16 and a mechanical switch 17 which is closed when coil 14 is to be heated. Other known means for activating heating coil 14 may alternatively be employed.

The resistance switch element 13 may, as shown, comprise a pair of metal plates 18, 19 and a thermally sensitive resistance material 20 therebetween. Electrical leads 21 and 22 connect circuit 11 to the outer faces of plates 18 and 19. Metal plates 18 and 19 may be in the form of discs, and heating coil 14 may form substantially a ring around the switch element immediately adjacent (but not in electrical contact with) the resistance material 20.

When it is desired to heat resistance material 20, switch 17 may be closed, thereby heating coil 14 and indirectly heating resistance material 20. When switch 17 is opened, resistance material 20 is cooled by virtue of exposure to the ambient temperature. Plates 18 and 19 are preferably made as thin as possible, consistent with rigidity requirements, so that the heat capacity of the switch element is at a minimum, thereby allowing quick heating and cooling, as is desired for a rapid switching action. For rapid switching, it is also desirable to use a resistance material 20 having a relatively small volume and large surface area. This is best obtained by utilizing said material in the form of a thin layer or film as shown in FIG.

1. On the other hand, for slower switching action, the resistance material 20 may be in a more massive form.

It should be noted that if a switch 17 is used in the heating circuit 15, as in FIG. 1, to control the temperature of the switch element 13, this switch 17 will be a very small switch which will in effect control the flow of a much larger current in the power circuit 11. There is thus, in effect, a large amplification of the current.

It should be understood, further, that the exposure of the switch element 13 to indirect heating is not necessarily limited to heating by means of coil 14. Any other suitable form of indirect heating, not necessarily involving the use of an electrical heater, may be employed. For example, in the case of a fire alarm system, no heating coil is required—the application of heat coming from the fire itself. In the case of a missile or spacecraft, the heating coil 14 may also be dispensed with—the heat being supplied by direct sunlight whenever the vehicle is oriented in the appropriate direction to receive sunlight directly or indirectly on said resistance switch element 13.

In order to satisfy the requirements of a resistance switch, as set forth above, I utilize as the resistance material a known semiconductor material having a large decrease in resistance with increase in temperature. For example, the reduction in resistance when cuprous or cupric oxide is heated from 25 to 75° C. is of the order of magnitude of 99%, and much greater variations in resistance may be obtained if a larger temperature interval is employed. However, in order to make use of semiconductor materials having such high resistance changes, it is generally necessary to take into account their high resistivities by the use of the material in the form of thin films (e.g. $10^{-3}$ to $10^{-5}$ cm. thick).

In seeking to find thermally sensitive resistance materials having suitably high variations in resistivity, I have discovered that instead of the continuous decrease in resistivity with increased temperature characteristic of semiconductors—which necessarily requires a relatively large temperature change—a discontinuous or stepwise decrease in the resistance of some semiconductors occurs when they melt. This is not characteristic of all semiconductors, but is generally characteristic of those whose resistivity is relatively high at the melting point, e.g., $10^3$ ohm-cm. or more. For example, it is found in the case of iodine, which is a low-melting semiconductor. Iodine melts at 114° C., and has a stepwise decrease of resistivity at that temperature from $6.2 \times 10^7$ to $1.4 \times 10^3$ ohm-cm., or a factor of about 50,000 without requiring a large change in temperature.

Figure 2:
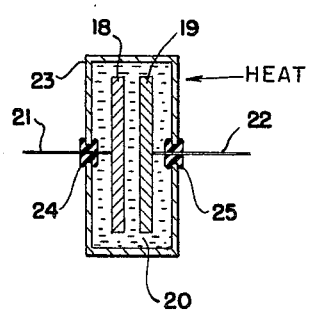
FIG. 2 is a fragmentary cross-sectional view of a first modified type of resistance switch element for use in the system shown in FIG. 1.

Since iodine reacts chemically with metals to form a metal iodide, which generally will not melt until a considerably higher temperature, and which in the solid state at the melting point of iodine has a fairly high resistivity, it is preferred when using iodine as the resistance switch material to use a metal toward which iodine is not very reactive. For example, I may use, as shown in FIG. 2, spaced apart magnesium plates 18 and 19 in a container 23 filled with solid iodine 20. While magnesium can react with iodine under appropriate conditions, it forms an extremely thin adherent stable film of magnesium iodide which prevents any substantial reaction, and which is too thin to create an excessive resistance to the switching element. Similar results can be obtained with other metals which form iodides which do not decompose or vaporize near the operating temperature, provided the density of the iodide is greater than that of the bare metal. The container 23 should have sufficient flexibility to permit expansion and contraction as the iodine melts and freezes; and may for example be made of light-gauge metal, electrically insulated from leads 21 and 22 by insulating bushings 24 and 25, respectively. The volume of iodine should be small in order to reduce the reaction time of the switch, and so should be the space between plates 18 and 19 in order to reduce the resistance of the switch when operating to pass current therethrough.

Figure 3:
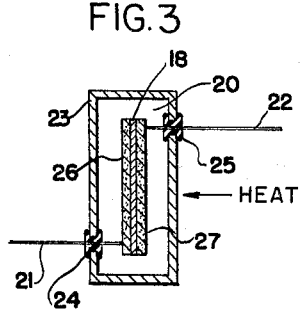
FIG. 3 is a fragmentary cross-sectional view of a second modified type of resistance switch element for use in the system shown in FIG. 1.

A modification of the switch referred to immediately above may be made by using a metal which is reversibly reactive with iodine, e.g. aluminum instead of magnesium. Aluminum is useful in this connection because its iodide has a substantial vapor pressure below its melting point of 360° C., and because its resistivity is higher than that of most iodides. A preferred resistance switch element of this type is as shown in FIG. 3. In this case the container 23 is filled with iodine vapor 20. Container 23 in this case may be rigid, rather than flexible. An aluminum plate 18 is placed in container 23, in contact with iodine vapor 20 so that films of aluminum iodide 26 and 27 are formed on each side of said plate 18. Electrical leads 21 and 22 make contact with said films 26 and 27 respectively, without breaking through said films to short out on the underlying metal 18. This may be accomplished in known manner, for example by utilizing contacts in the form of flat screens which are pressed against the film without penetrating it and without blocking its exposure to the iodine vapor 20. Electrical leads 21 and 22 are also protected from shorting out on container 23 by means of insulating bushings 24 and 25, respectively. As the temperature varies, the amount of iodine chemisorbed as the metal iodide, or desorbed, varies, thereby varying the resistance of the switch. An increase of temperature causes dissociation of the iodide, or desorption of the iodine, thus leaving a purer metal having lower electrical resistance, through which the current travels.

Figure 4:
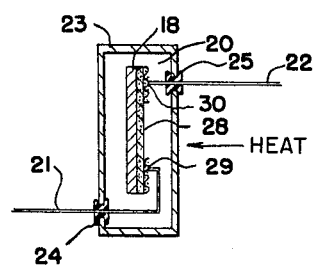
FIG. 4 is a fragmentary cross-sectional view of a third modified type of resistance switch element for use in the system shown in FIG. 1.

If desired, various other combinations of metals and reversibly reactive gaseous environments may be used, such as chlorine or bromine in place of iodine. As another example, the resistance of copper oxide is greatly reduced by an increase in the amount of excess oxygen chemisorbed in it. This may be taken advantage of in a switching element of the type shown in FIG. 4. Here a copper plate 18 is placed in a container 23 containing oxygen gas 20. A copper oxide coating 28 covers the copper plate 18. Leads 21 and 22 contact opposite ends of said coating 28 through perforated plate contacts 29 and 30, respectively, being insulated from container 23 by insulating bushings 24 and 25, respectively. As the temperature is raised (particularly, in the high temperature range), the amount of excess oxygen chemisorbed in the copper oxide coating decreases by desorption. This greatly increases the resistance of the copper oxide and hence of the switching element, since most of the resistance in this case is attributable to the resistance of the copper oxide coating.

I have discovered, further, that the use of hydroxides and halides as described above, may be modified by operation in a temperature region in which they melt. It has been found that the alkali metal hydroxides, e.g., NaOH, KOH, and LiOH, melt at roughly 400° C. but are stable up to temeratures above 1000° C., and that in the solid state they will block commercial voltages (e.g. 110 or 220 volts) with negligible "leakage" current, i.e. with resistances of $10^5$ ohms or more, while in the molten condition they have good electrical conductivities. They may thus be utilized as resistance switch elements in the device shown in FIG. 2. Furthermore, if a finely divided solid "diluent" material is dispersed in said alkali, mechanical stability may be achieved, so that the device shown in FIG. 1 may be used if desired. However, it is preferred to enclose the material in a sealed container, since the alkalies are reactive toward moisture and carbon dioxide. The diluent may be an insulator, if desired, or it may be a semiconductor or a metal, depending on whether or not it is important to minimize the resistance of the switch at the operating temperature, which in these cases may be at about 400° C., the melting point.

Instead of using an alkali metal hydroxide, I may use $Ba(OH)_2 \cdot 8H_2O$ which melts at the low temperature of about 78° C., is stable up to about 780° C. and has the desired resistivity characteristics. Alternatively, I may use other ionic compounds which have high resistivities in the solid state and are good conductors in the liquid state, provided they have reasonably low melting points and reasonably high boiling or decomposition temperatures. Examples include the halides of thallium, zinc, and copper. The desired temperature range of operation will of course affect the selection of the appropriate "flux" or melting material.

In order to avoid the necessity for massive melting of substantial quantities of the "flux," I have found it desirable to add a high-melting "diluent" which forms a eutectic with the flux. This lowers the melting point of the flux somewhat. Its principal effect aside from adding mechanical stability, however, is that it makes it possible to melt a controlled small amount of the flux without massive melting of the flux, since the amount of melting is limited by the temperature (whereas this is not so in the case of a pure "flux"). This speeds up the response of the resistance switch to change in temperature. It also makes it possible to control the switch at a partially closed position. Preferably the eutectic-forming diluent should itself have the characteristics of high resistivity in the solid state and low resistivity in the liquid state. It must also have a melting point which is substantially higher than that of the flux.

Figure 5:
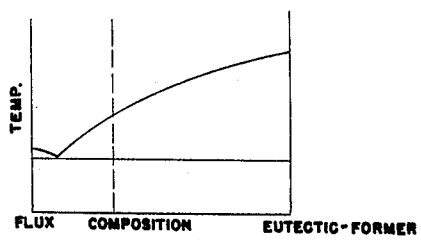
FIG. 5 is a temperature-composition diagram relative to certain compositions of matter useful in resistance switch elements.

The eutectic-former selected will usually be one which is chemically unreactive with the flux, in order to avoid the formation of by-products of undesired properties; however, this depends on the particular circumstances. In order to take full advantage of the presence of the high-melting eutectic-former, i.e. in order to provide controlled melting, it is usually preferred to have present a sufficient quantity of the eutectic-former to exceed the eutectic composition, as shown by the dotted line in FIG. 5. This is not necessary however, when the eutectic temperature is substantially lower than the melting point of the flux.

A particularly effective resistance switch may be prepared from a composite containing a relatively large quantity of finely divided metal dispersed in a matrix consisting of a mixture of flux and a high-melting eutectic-former having a suitable composition for controlled melting. Such a composite material has low resistance when at its operating temperature, and high response speed.

Particularly good compositions have been found to consist of an alkali metal hydroxide (e.g. NaOH, KOH, or LiOH) as flux, with a carbonate of the same alkali metal (i.e. $Na_2CO_3$, $K_2CO_3$, or $Li_2CO_3$, respectively) as the high melting eutectic-former. Preferably this composition is used with a metal "diluent" as described above, but this is not always necessary.

In connection with the resistance switches described above, it should be noted that if a D.C. voltage is applied which is high enough to electrolyze an ionic compound comprising a component of the switch element (and this may not require more than 1–5 volts), one must expect that said ionic component may eventually be thus decomposed. Thus, ionic compounds should normally not be used in resistance switched for D.C. sources, particularly at high voltages, but should normally be limited for use with A.C. sources. I have found that commercial A.C. voltages (e.g. 110 or 220 volts) cause no decomposition of ionic compounds in the above-described resistance switch elements.

Figure 6:
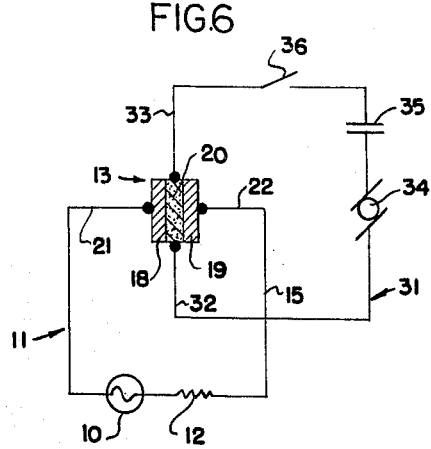
FIG. 6 is a schematic diagram showing a second mode of activation of a resistance switch element.

I have found that the aforementioned ionic compound flux-type resistance switch elements may be activated by means of an applied voltage instead of by indirect heating. One method of doing this is shown schematically in FIG. 6. The resistance switch element 13 in this case (comprising the ionic compound flux together with such diluents as may be desired) is shown schematically between metal plates 18 and 19 which are in the principal electrical circuit 11. A secondary electrical circuit 31 is shown connected across the opposite edges of the flux material 20, through leads 32, 33. A D.C. generator 34 is shown in this circuit 31, supplying a condenser 35 when switch 36 is open. When switch 36 is instantaneously closed and opened, condenser 35 discharges through the flux material 20, instantaneously activating switch element 13 to pass A.C. current continuously through circuit 11.

It will thus be noted that I have described various preferred embodiments of my invention, comprising switching and like devices which are based on the variation of electrical resistance of a switching element caused by a variation of its internal thermodynamic condition (e.g. temperature, electric potential, chemical composition, and/or phase) in response to an external change in its surroundings adequate to produce said change in internal thermodynamic condition, without mechanical motion of the switch element to make or break an electrical contact.

Other modifications in the details of the invention may be made without departing from the spirit of the invention, the principal novel features of which are set forth below.

In the claims which follow, I have used the term "switch" in the generic sense described above, i.e. so as to include relays and the like, and I have used expressions such as "open" and "close" and electrical circuit to signify that the resistance of the switch element varies from a sufficiently high value to reduce any current flow therethrough to an acceptably low minimal, substantially negligible value (when "open"), to a sufficiently low resistance to permit current to flow therethrough at an acceptably low power loss and maximal current (when "closed").

I claim:

1. A switch device for an electrical circuit, comprising a closed housing, an element in said housing adapted to be inserted in said circuit, having the characteristics of a predetermined large reversible change of electrical resistance under a predetermined change in temperature, said element comprising a solid metallic material exposed in said housing to an environment confined in said housing and containing a fluid material capable of being adsorbed on the surface thereof in response to said change in temperature, said metallic material having a substantially different electrical resistivity when a substantial amount of said fluid material has been adsorbed thereon than when said fluid material has been substantially desorbed therefrom, spaced apart electrical contacting members maintained in electrical contact with the surface of said metallic material, leads extending from said contacting members externally of said housing for connection to said electrical circuit, and means for producing said temperature change, whereby in substantial effect to close and open said circuit without the necessity for mechanical motion of said element to make or break an electrical contact.

2. A switch device for an electrical circuit, comprising a closed housing, an element in said housing adapted to be inserted in said circuit comprising a solid material exposed to an environment confined in said housing and containing a fluid substance capable of adsorption and desorption on said solid material, the electrical resistivity of said solid material being greatly dependent on the extent of adsorption of said fluid substance thereon, spaced apart electrical contacting members maintained in electrical contact with the surface of said solid material, leads extending from said contacting members externally of said housing for connection to said electrical circuit, and means for varying the thermodynamic conditions of said environment thereby to change the degree of adsorption sufficiently in substantial effect to close and open said circuit without the necessity for mechanical motion of said element to make or break an electrical contact.

3. A switch device for an electrical circuit, comprising a closed housing, a solid state semiconductor material in said housing, a pair of spaced apart electrodes contacting said solid state semiconductor material for electrically connecting the same in series in the electrical circuit for controlling the current therein, said solid state semiconductor material having one internal condition which is of one chemical composition and which is of high electrical resistance for substantially blocking the current in either direction or alternately in both directions and having another internal condition which is of another chemical composition and which is of low electrical resistance for substantially conducting the current in either direction or alternately in both directions, leads extending from said electrodes externally of said housing for connection to said electrical circuit, and means for reversibly changing the internal conditions of the solid state semiconductor material between said one and other conditions.

4. A switch device for an electrical circuit, comprising a closed housing, a solid state semiconductor material in said housing, a pair of spaced apart electrodes contacting said solid state semiconductor material for electrically connecting the same in series in the electrical circuit for controlling the current therein, said solid state semiconductor material including an oxide and having one internal condition which includes one amount of oxygen therein and which is of high electrical resistance for substantially blocking the current in either direction or alternately in both directions and having another internal condition which includes another amount of oxygen therein and which is of low electrical resistance for substantially conducting the current in either direction or alternately in both directions, leads extending from said electrodes externally of said housing for connection to said electrical circuit, and means for reversibly changing the internal conditions of the solid state semiconductor material between said one and other conditions.

5. A switch device for an electrical circuit, comprising a closed housing, a solid state semiconductor material in said housing, a pair of spaced apart electrodes contacting said solid state semiconductor material for electrically connecting the same in series in the electrical circuit for controlling the current therein, said solid state semiconductor material including an iodide or bromide or chloride and having one internal condition which includes one amount of iodine or bromine or chlorine and which is of high electrical resistance for substantially blocking the current in either direction or alternately in both directions and having another internal condition which includes another amount of iodine or bromine or chlorine therein and which is of low electrical resistance for substantially conducting the current in either direction or alternately in both directions, leads extending from said electrodes externally of said housing for connection to said electrical circuit, and means for reversibly changing the internal conditions of the solid state semiconductor material between said one and other conditions.

6. A switch device for an electrical circuit, comprising a closed housing, a thin layer of a solid state semiconductor material in said housing and including an oxide, a pair of spaced apart electrodes contacting opposite sides of the thin layer of said solid state semiconductor material for electrically connecting the same in series in the electrical circuit for controlling the current therein, said solid state semiconductor material having one internal condition which is of high electrical resistance for substantially blocking the current in either direction or alternately in both directions and having another internal condition which is of low electrical resistance for substantially conducting the current in either direction or alternately in both directions, leads extending from said electrodes externally of said housing for connection to said electrical circuit, and means for reversibly changing the internal conditions of the solid state semiconductor material between said one and other conditions.

7. A switch device for an electrical circuit, comprising a closed housing, a thin layer of a solid state semiconductor material in said housing and including a halide, a pair of spaced apart electrodes contacting opposite sides of the thin layer of said solid state semiconductor material for electrically connecting the same in series in the electrical circuit for controlling the current therein, said solid state semiconductor material having one internal condition which is of high electrical resistance for substantially blocking the current in either direction or alternately in both directions and having another internal condition which is of low electrical resistance for substantially conducting the current in either direction or alternately in both directions, leads extending from said electrodes externally of said housing for connection to said electrical circuit, and means for reversibly changing the internal conditions of the solid state semiconductor material between said one and other conditions.

References Cited by the Examiner
UNITED STATES PATENTS

| | | | |
|---|---|---|---|
| 2,080,953 | 5/1937 | Rensch | 73—27 |
| 2,790,704 | 4/1957 | Lewis | 23—92 X |
| 2,975,362 | 3/1961 | Jacobson | 73—23 X |
| 2,999,379 | 9/1961 | Beard et al. | 73—23 |
| 3,039,053 | 6/1962 | Jacobson | 73—23 X |
| 3,040,561 | 6/1962 | Wright | 73—23 |
| 3,121,853 | 2/1964 | Jason et al. | 338—35 |
| 3,186,225 | 6/1965 | Freeman et al. | 338—35 X |

RICHARD M. WOOD, *Primary Examiner.*

W. D. BROOKS, *Assistant Examiner.*